(12) United States Patent
Ballantine et al.

(10) Patent No.: US 7,691,507 B2
(45) Date of Patent: *Apr. 6, 2010

(54) COMBINATION FUEL CELL AND ION PUMP, AND METHODS AND INFRASTRUCTURE SYSTEMS EMPLOYING SAME

(75) Inventors: Arne W. Ballantine, Round Lake, NY (US); Glenn A. Eisman, Niskayuna, NY (US); Richard L. Chartrand, Ballston Lake, NY (US); Norio Komura, Saitama (JP); Ikuya Yamashita, Saitama (JP)

(73) Assignees: Plug Power Inc., Latham, NY (US); Honda Motor Co., Ltd., Tokyo (JP)

( * ) Notice: Subject to any disclaimer, the term of this patent is extended or adjusted under 35 U.S.C. 154(b) by 37 days.

This patent is subject to a terminal disclaimer.

(21) Appl. No.: 11/774,966

(22) Filed: Jul. 9, 2007

(65) Prior Publication Data

US 2007/0254195 A1 Nov. 1, 2007

Related U.S. Application Data

(63) Continuation of application No. 10/658,123, filed on Sep. 9, 2003, now Pat. No. 7,252,900.

(51) Int. Cl.
*H01M 8/04* (2006.01)

(52) U.S. Cl. ............................. 429/13; 429/21; 429/22; 429/38

(58) Field of Classification Search ................ None
See application file for complete search history.

(56) References Cited

U.S. PATENT DOCUMENTS

| | | | |
|---|---|---|---|
| 5,527,632 A | 6/1996 | Gardner et al. | 429/27 |
| 5,635,039 A | 6/1997 | Cisar et al. | 204/252 |
| 6,152,191 A | 11/2000 | Chan et al. | 141/18 |
| 6,280,865 B1 | 8/2001 | Eisman et al. | 429/17 |
| 6,432,283 B1 | 8/2002 | Fairlie et al. | 204/230.2 |

(Continued)

FOREIGN PATENT DOCUMENTS

DE 198 14 106 A1 10/1998

(Continued)

OTHER PUBLICATIONS

Sedlak et al., "Hydrogen Recovery and Purification Using the Solid Polymer Electrolyte Electrolysis Cell," Int. J. Hydrogen Energy, vol. 6, pp. 45-51, (1981).

(Continued)

*Primary Examiner*—Jonathan Crepeau
(74) *Attorney, Agent, or Firm*—Heslin Rothenberg Farley & Mesiti P.C.

(57) ABSTRACT

A combination fuel cell and hydrogen or oxygen pump includes an electrochemical cell comprising an anode inlet for receiving fuel, an anode outlet for exhausting fuel, a cathode inlet for receiving oxidant, a cathode outlet for exhausting oxidant, and first and second electrical connectors. A controller is operable for applying an electrical load to the electrochemical cell for generating electricity, and for applying an electrical potential to the electrochemical cell for purifying hydrogen or purifying oxygen. Methods and infrastructure systems are also disclosed.

13 Claims, 12 Drawing Sheets

U.S. PATENT DOCUMENTS

| | | | | |
|---|---|---|---|---|
| 6,745,105 | B1 | 6/2004 | Fairlie et al. | 700/273 |
| 7,045,233 | B2 | 5/2006 | McElroy et al. | 429/19 |
| 7,132,182 | B2 * | 11/2006 | McElroy et al. | 429/17 |
| 7,141,323 | B2 * | 11/2006 | Ballantine et al. | 429/17 |
| 7,252,900 | B2 | 8/2007 | Ballantine et al. | 429/13 |
| 2001/0033954 | A1 | 10/2001 | Gyoten et al. | 429/21 |
| 2003/0155252 | A1 | 8/2003 | Juda et al. | 205/354 |
| 2004/0028960 | A1 | 2/2004 | McElroy et al. | 429/13 |
| 2004/0028979 | A1 | 2/2004 | Ballantine et al. | 429/34 |
| 2006/0068246 | A1 | 3/2006 | Matsuo et al. | 429/19 |
| 2007/0034507 | A1 | 2/2007 | Sin et al. | 204/290.1 |
| 2007/0042241 | A1 | 2/2007 | Matsuo et al. | 429/21 |

FOREIGN PATENT DOCUMENTS

| | | |
|---|---|---|
| DE | 200 02 118 U1 | 6/2001 |
| WO | WO 2004/086534 A2 | 10/2004 |

OTHER PUBLICATIONS

Phill by FuelMaker- Fuel Maker Vehicle Refueling Appliance Operating Instructions, FuelMaker Corporation, Issue 5, 17 pages, Mar. 2005.

Phill by FuelMaker- Fuel Maker Vehicle Refueling Appliance Installation Instructions, FuelMaker Corporation, Issue 5, 25 pages, Mar. 2005.

Phill by FuelMaker—Fuel Your Car At Home; http://www.myphill.com/index.htm, 4 pages, copyrighted in 2001, retrieved Apr. 2005.

"Hydrogen Fuelling Infrastructure Available from FuelMaker," http://fuelmaker.com/News/PressReleases/News_5.htm, 1-page, copyrighted in Aug. 2001, retrieved Apr. 2005.

"Refuel FCVs at Home with FuelMaker Device,", Vicki P. McConnell, http://fuelmaker.com/News/Media/FuelFCVatHome.htm, 2 pages, copyrighted in 2001, retrieved Apr. 2005.

"Hydrogen Refueling," http://www.fuelmaker.com/Products/HydrogenRefueling/, 2 pages, copyrighted in 2001, retrieved Apr. 2005.

Stuart Energy Station, http://stuartenergy.com/our_products/stuart_entery_station.html, 8 pages, copyrighted in 2005, retrieved Apr. 2005.

Stuart Energy Station Brochure, 12 pages, copyrighted Dec. 7, 2004.

* cited by examiner

US 7,691,507 B2

COMBINATION FUEL CELL AND ION PUMP, AND METHODS AND INFRASTRUCTURE SYSTEMS EMPLOYING SAME

PRIORITY CLAIM AND CROSS-REFERENCE TO RELATED APPLICATIONS

This application is a continuation of U.S. patent application Ser. No. 10/658,123, filed on Sep. 9, 2003, now U.S. Pat. No. 7,252,900, entitled "Combination Fuel Cell And Ion Pump, And Methods And Infrastructure Systems Employing Same," the entire subject matter of which is incorporated herein by reference.

FIELD OF THE INVENTION

This invention relates generally to electrochemical cells, and more particularly, to fuel cells and ion pumps such as hydrogen pumps and oxygen pumps.

BACKGROUND OF THE INVENTION

Hydrogen is an important zero emission fuel. Recently, development of hydrogen fuel infrastructure systems has become a priority to support the use of hydrogen as a fuel.

An important part of a hydrogen fuel infrastructure system is generation of hydrogen. Two methods are generally used for generating hydrogen. One method includes a reforming process for generating hydrogen, e.g., converting fuel such as natural gas or propane into a hydrogen-rich gas. Another method includes an electrolysis process which uses electrical energy to split water molecules into hydrogen and oxygen.

With either method, the hydrogen is often purified and/or compressed so that it can be stored for usage. Hydrogen pumps, have been used for hydrogen purification and/or compression of hydrogen rich gas.

There is a need for further improvements in hydrogen fuel infrastructure systems.

SUMMARY OF THE INVENTION

The present invention provides in a first aspect, a combination fuel cell and ion pump which includes an electrochemical cell comprising an anode inlet for receiving fuel, an anode outlet for exhausting fuel, a cathode inlet for receiving oxidant, a cathode outlet for exhausting oxidant and at least one of purified oxygen and purified hydrogen, and a first electrical connector and a second electrical connector. A controller is operable for applying an electrical load to the first and the second electrical connectors wherein the electrochemical cell acts as a fuel cell to generate electricity, and applying an electrical potential to the first and the second electrical connectors wherein the electrochemical cell acts as at least one of a hydrogen pump to purify hydrogen and an oxygen pump to purify oxygen.

The present invention provides in a second aspect, a combination fuel cell and hydrogen pump which includes a first electrochemical cell and a second electrochemical cell. The first electrochemical cell includes an anode inlet for receiving fuel, an anode outlet for exhausting fuel, a cathode inlet for receiving oxidant, a cathode outlet for exhausting oxidant, a purified hydrogen outlet for discharging purified hydrogen, and a first electrical connector and a second electrical connector. The second electrochemical cell includes an anode inlet for receiving fuel, an anode outlet for exhausting fuel, a cathode inlet for receiving oxidant, a cathode outlet for exhausting at least one of oxidant and purified hydrogen, and a first electrical connector and a second electrical connector. A valve is disposed between the first electrochemical cell and the second electrochemical cell. The valve includes a first passageway for transferring fuel from the first electrochemical cell to the second electrochemical cell, a second passageway for transferring exhaust fuel from the second electrochemical cell to the first electrochemical cell, a third passageway for controlling transfer of oxidant from the first electrochemical cell to the second electrochemical cell, a fourth passageway for controlling transfer of exhaust oxidant from the second electrochemical cell to the first electrochemical cell, and a fifth passageway for controlling transfer of purified hydrogen from the second electrochemical cell to the purified hydrogen outlet.

The present invention provides in a third aspect, hydrogen infrastructure system and oxygen infrastructure systems which include the combination fuel cell and ion pump described above, a storage tank for storing purified hydrogen or purified oxygen from the combination fuel cell and ion pump, and a reformer for supplying fuel to the combination fuel cell and ion pump.

The present invention provides in a fourth aspect, a method for generating electricity and purifying at least one of hydrogen and oxygen in which the method includes providing an electrochemical cell having an anode inlet for receiving fuel, an anode outlet for exhausting fuel, a cathode inlet for receiving oxidant, and a cathode outlet for exhausting oxidant and at least one of purified hydrogen and purified oxygen, and operating the electrochemical cell to generate electricity and at least one of purify hydrogen and purified oxygen.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and accompanying drawings in which:

DETAILED DESCRIPTION OF THE INVENTION

Figure 1:
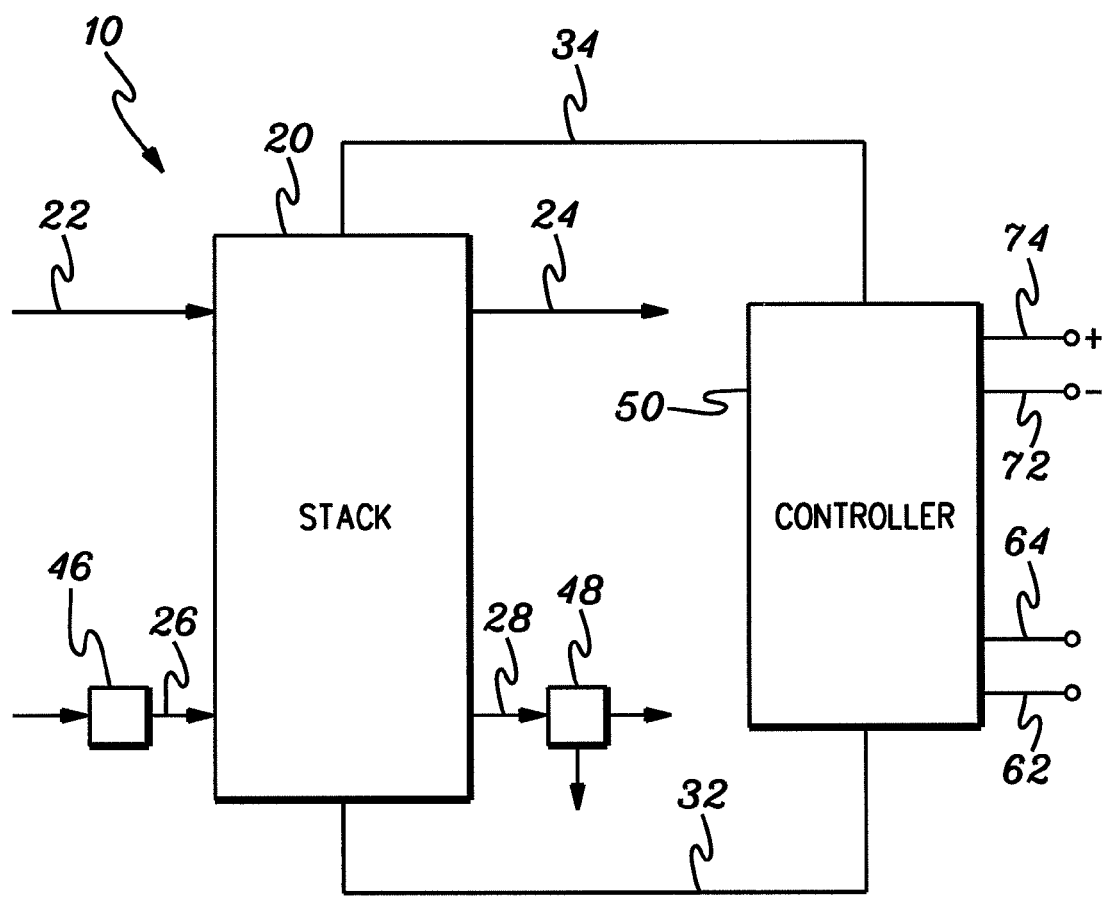
FIG. 1 is a diagrammatic illustration of a combination fuel cell and hydrogen pump in accordance with the present invention.

FIG. 1 illustrates a combination fuel cell and ion pump 10 which may be configured in a fuel cell mode for generating electricity and in a hydrogen pump mode for purifying and/or compressing hydrogen, and which may be suitably employed in a hydrogen fuel infrastructure system.

Hydrogen fuel infrastructure systems such as refueling stations may have multiple functions, e.g., hydrogen production, electricity production, and heat generation. The present invention overcomes the drawback of having to provide two separate devices such as a fuel cell for generating electricity and a hydrogen pump for purifying and/or compressing hydrogen. Such a combination also reduces the costs and also the space required compared to providing two separate devices.

Combination 10 generally includes at least one electrochemical cell, for example which may be a stack 20 of electrochemical cells as illustrated in FIG. 1, having an anode inlet 22 for receiving a fuel such as reformate, an anode outlet 24 for exhausting fuel such as reformate, a cathode inlet 26 for receiving an oxidant such as air, a cathode outlet 28 for exhausting oxidant such as air or purified hydrogen, and a first electrical connector 32 and a second electrical connector 34 for applying an electrical load or an electrical potential to stack 20.

A first valve 46 is attached to cathode inlet 26 for controlling oxidant to stack 20. A second valve 48, for example a three-way valve, is attached to cathode outlet 28 for either exhausting oxidant from stack 20 in a first direction or exhausting purified hydrogen in a second direction different from the first direction.

A controller 50 is attached to first electrical connector 32 and second electrical connector 34 for applying either an electrical load to stack 20 for generating electricity, or an electrical potential to stack 20 for purifying hydrogen. Controller 50 may include electrical output terminals 62 and 64 for applying an electrical load to stack 20. For example, a rechargeable battery may be connected to electrical output terminals 62 and 64. Controller 50 may also include electrical input terminals 72 and 74 for applying an electrical potential to stack 20. Controller 50 may include mechanical switch or switches or may be automated and include a microprocessor or microcontroller.

Stack 20 may be categorized according to the type of electrolyte (for example, solid polymer, polybenzimidazole (PBI) based membrane, alkaline, or phosphoric acid) used to accommodate ion transfer during operation.

For example, combination 10 may include a solid polymer electrochemical cell comprising a membrane electrode assembly (MEA). The MEA typically includes a solid polymer membrane or proton exchange membrane (PEM) sandwiched between and in contact with two electrodes: one electrode commonly referred to as the anode and the other electrode commonly referred to as the cathode. The membrane is typically made of a porous, electrically-conducting sheet material. The electrodes are typically made from carbon-fiber paper or cloth. In addition, at the interface of the electrode and membrane, that is, sandwiched therebetween, a catalyst layer may be provided to facilitate the electrochemical reaction. Typically, the MEA is placed between two electrically conductive graphite plates, which have one or more reactant flow passages impressed on the surface. The reactant flow passages direct the flow of reactants (e.g., reformate or air) to the membrane electrode assembly. A plurality of electrochemical cells may be formed into a stack with suitable manifolds therein for transferring the reactants to and from each of the plurality of cells.

Figure 2:
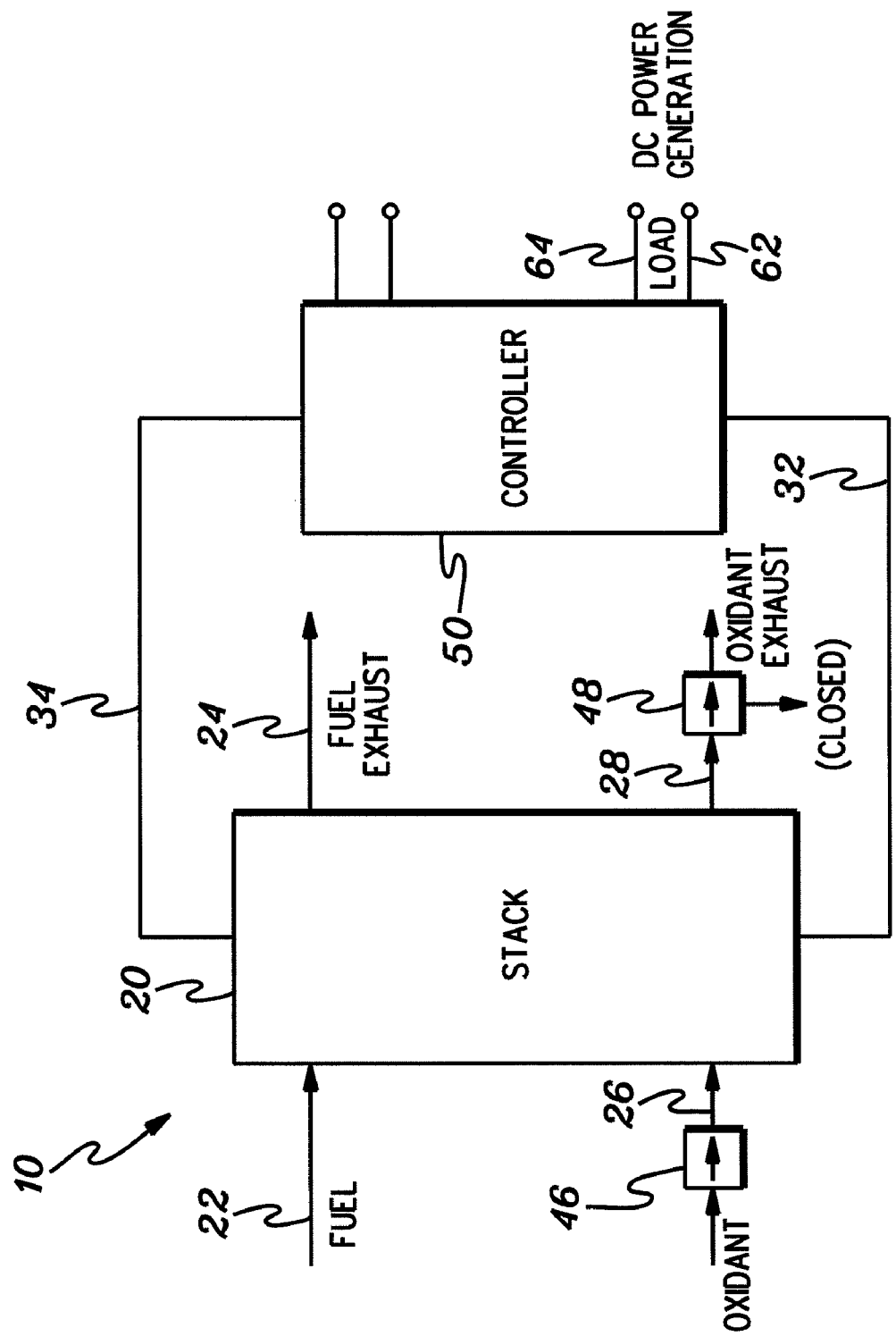
FIG. 2 is a diagrammatic illustration of the combination fuel cell and hydrogen pump of FIG. 1 configured as a fuel cell.

FIG. 2 illustrates combination 10 configured in a fuel cell mode for generating electricity. For example, fuel is supplied to anode inlet 22 and exhausted via anode outlet 24, first valve 46 is operated to allow a supply of oxidant to cathode inlet 26, and second valve 48 is operated to exhaust oxidant from cathode outlet 28 in a first direction, e.g., to a vent. Electrical output terminals 62 and 64 of controller 50 are connected to an electrical load which load is applied across stack 20 via electrical connectors 32 and 34.

In the configuration of combination 10 in a fuel cell mode, as fuel such as reformate flows into the electrical chemical cell anode, a catalyst coating on the anode helps to separate the gas into protons (hydrogen ions) and electrons. The electrolyte membrane in the center allows only the protons to pass through the membrane to the cathode side of the electrochemical cell. The electrons cannot pass through this membrane and flow through an external circuit in the form of electric current. As oxidant (e.g., oxygen in air) flows into the fuel cell cathode, another catalyst coating helps the oxygen, protons, and electrons combine to produce pure water and heat.

Figure 3:
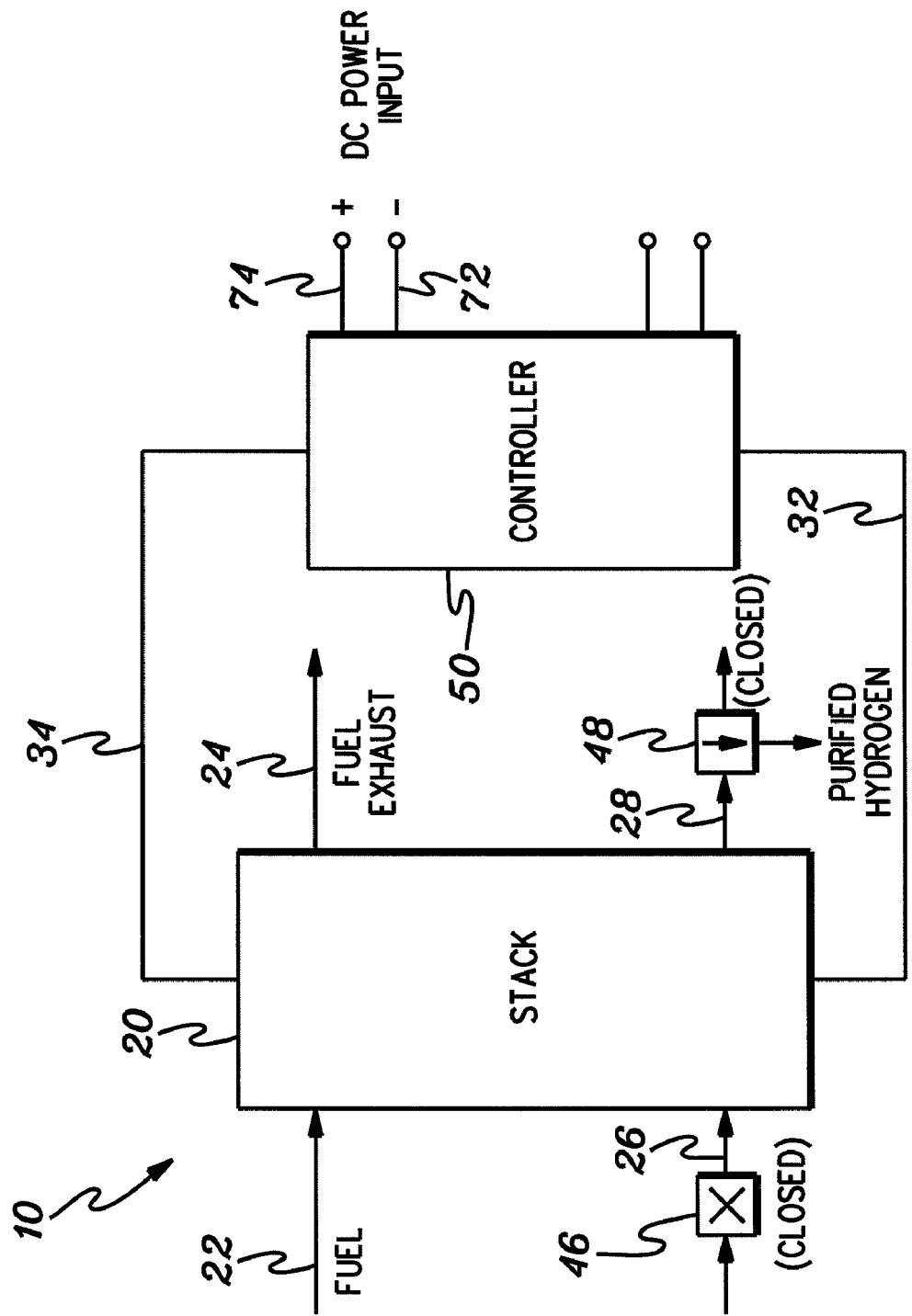
FIG. 3 is a diagrammatic illustration of the combination fuel cell and hydrogen pump of FIG. 1 configured as a hydrogen pump.

FIG. 3 illustrates combination 10 configured in a hydrogen pump mode for purifying and/or compressing hydrogen. For example, fuel such as reformate is supplied to anode inlet 22 and exhausted via anode outlet 24, first valve 46 is operated to close or block the supply of oxidant to cathode inlet 26, and second valve 48 is operated to direct purified hydrogen in a second direction (e.g., the first direction for directing exhaust oxidant as shown in FIG. 2 is closed or blocked). Electrical input terminals 72 and 74 of controller 50 may be connected to a power supply for providing an electrical potential across stack 20 via electrical connectors 32 and 34.

In the configuration of combination 10 in a hydrogen pump mode, fuel flows into the electrochemical cell anode, electrical energy is supplied between the electrodes to overcome the internal resistance of the electrochemical cell, dissociate the hydrogen in the gas-to-be treated to protons, and drive the protons through the membrane to the opposite side for recovery as purified and/or pressurized hydrogen at the cathode outlet. The hydrogen stream may be stored or may be humidified by introduction of water and then stored. A humidified purified hydrogen may also be produced using an electrochemical cell which includes NAFION which allows the transfer of water as well as hydrogen.

Figure 4:
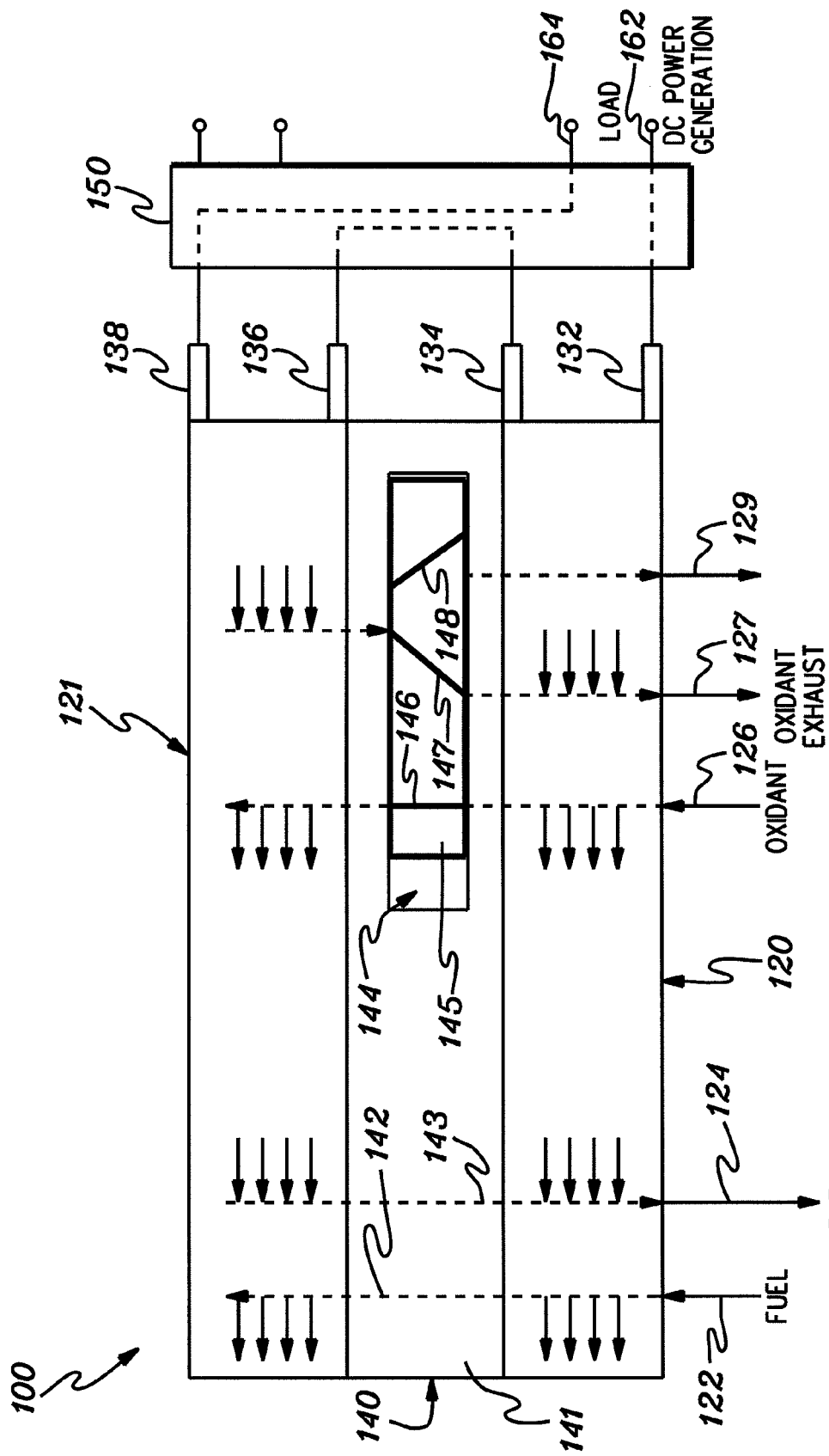
FIG. 4 is a diagrammatic illustration of an alternative embodiment of a combination fuel cell and hydrogen pump in accordance with the present invention configured as a fuel cell.
Figure 5:
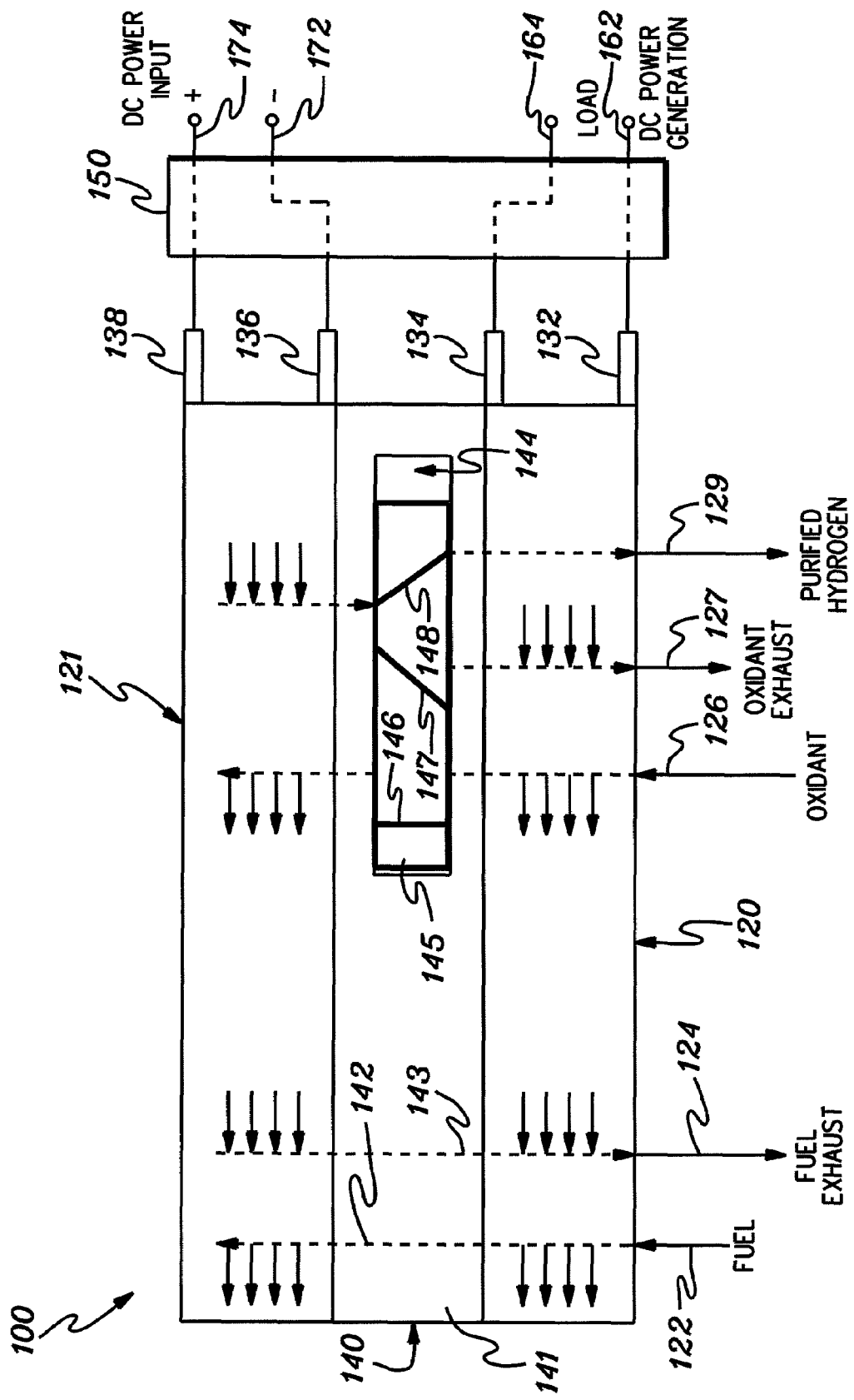
FIG. 5 is a diagrammatic illustration of the combination fuel cell and hydrogen pump of FIG. 4 configured as a fuel cell and hydrogen pump.

FIGS. 4 and 5 illustrate an alternative embodiment of a combination fuel cell and hydrogen pump 100 which may be configured in a fuel cell mode for generating electricity and in a hydrogen pump mode for purifying and/or compressing hydrogen. Combination 100 may also be suitably employed in a hydrogen fuel infrastructure system. As discussed in greater detail below, combination 100 is partitioned or includes two portions which may be suitably configured and operated so that combination 100 may operate in fuel cell mode, or in both a fuel cell mode and a hydrogen pump mode.

Combination 100 generally includes at least one first electrochemical cell, for example a first stack 120 of electrochemical cells, and at least one second electrochemical cell, for example a second stack 121 of electrochemical cells. A valve 140 may be sandwiched between first stack 120 and second stack 121. Valve 140 may include a housing 141 having a first passageway 142, and a second passageway 143, and a chamber 144. Disposed in chamber 144 is a slidable member 145 having a third passageway 146, a fourth passageway 147, and a fifth passageway 148.

Combination 100 may also include an anode inlet 122 for receiving fuel such as reformate for first stack 120 and second stack 121, an anode outlet 124 for exhausting fuel from first stack 120 and second stack 121, a cathode inlet 126 for receiving oxidant such as air for first stack 120 and second stack 121, a cathode outlet 127 for exhausting oxidant from first stack 120 and second stack 121, and a purified hydrogen outlet 129 for discharging purified hydrogen from second stack 121. Stack 120 may further include a first electrical connector 132 and a second electrical connector 134 for applying an electrical load to first stack 120. Stack 121 may further include a first electrical connector 136 and a second electrical connector 138 for applying an electrical load or an electrical potential to second stack 121.

A controller 150 is attached to electrical connectors 132, 134, 136, and 138 for applying an electrical load to first stack 120 and second stack 121 for generating electricity, or applying an electrical load to first stack 120 for generating electricity and applying an electrical potential to stack 121 for purifying hydrogen. Controller 150 may include a mechanical switch or switches, or may be automated and include a microprocessor or microcontroller.

FIG. 4 illustrates the configuration of combination 100 wherein both first stack 120 and second stack 121 are operated in a fuel cell mode for generating electricity. For example, fuel such as reformate is supplied to anode inlet 122 for both stack 120 and stack 121, and exhausted via anode outlet 124 from both stack 120 and stack 121. Oxidant such as air is supplied to a cathode inlet 126. Valve 140 is positioned (e.g., using a suitable actuator under control of controller 150) so that oxidant is directed to the electrochemical cells of both stack 120 and stack 121, and also exhausted from the electrochemical cells of both stack 120 and stack 121. For example, valve 140 is positioned so that the supply of oxidant passes through first passageway 146 to second stack 121, and exhaust oxidant from second stack passes through passageway 147.

A load applied across electrical output terminals 162 and 164 of controller 150 may be operably applied across stack 120 and stack 121. For example, the load may be applied across electrical connector 132 of stack 120 and electrical connector 138 of stack 121, with electrical connector 134 of stack 120 connected to electrical connector 136 of stack 121. Accordingly, both stacks contribute to the generation of electrical power. While FIG. 4 illustrates the wiring of the two stacks in series, it will be appreciated that parallel wiring, or separate wiring of the two stacks may also be employed.

FIG. 5 illustrates the configuration of combination 100 wherein first stack 120 is operated in a fuel cell mode for generating electricity, and second stack 121 is operated in a hydrogen pump mode for purifying hydrogen. For example, fuel such as reformate is supplied to anode inlet 122 for both stack 120 and stack 121, and exhausted via anode outlet 124 from stack 120 and stack 121. Oxidant such as air is supplied to cathode inlet 126.

Valve 140 is positioned (e.g., using a suitable actuator under control of controller 150) so that oxidant via passageway 146 to stack 121 is blocked, exhaust from stack 121 via passageway 147 is blocked, and purified hydrogen from stack 121 is directed via passageway 148 to purified hydrogen outlet 129. A load applied across electrical output terminals 162 and 164 of controller 150 is operably applied across electrical connector 132 and electrical connector 134 of stack 120, while a direct current power supply attached to electrical input terminals 172 and 174 is electrically connected to electrical connector 136 and electrical connector 138 of stack 121. Accordingly, stack 120 contributes to the generation of electrical power, while stack 121 contributes to the purification of hydrogen. From the present description, it will be appreciated that stack 121 and valve 140 are similar to stack 20 and valves 46 and 48, e.g., valve 140 is comparable to valves 46 and 48. It will also be appreciated that other valve configuration and valving devices may be suitably employed for effecting the various gas flows.

Figure 6:
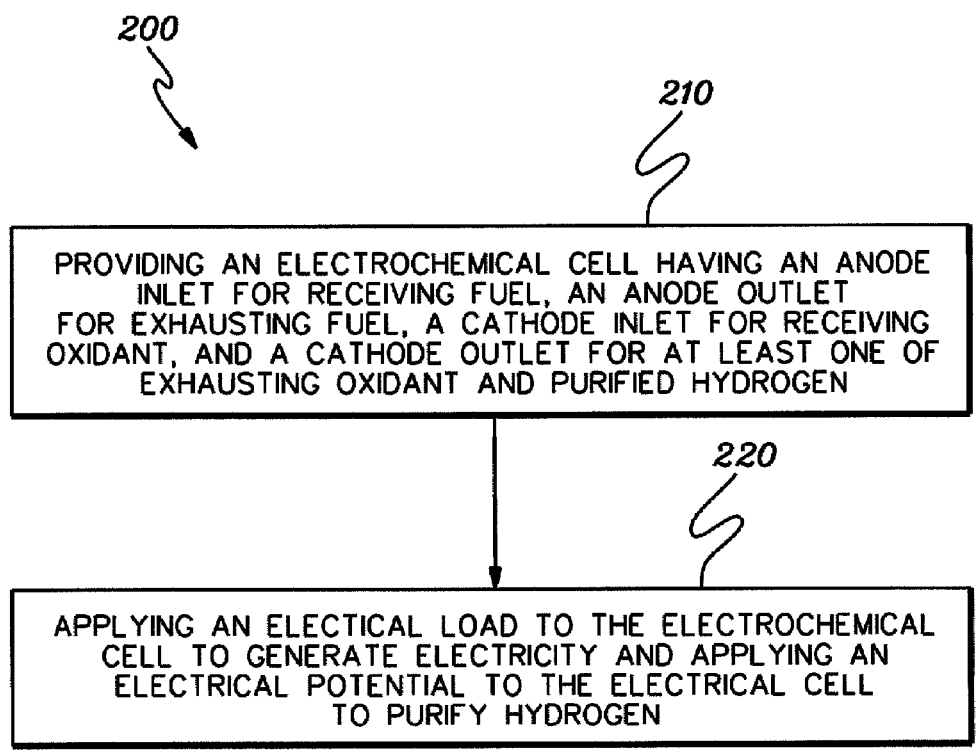
FIG. 6 is a flowchart of a method for generating electricity and purifying hydrogen in accordance with the present invention.

FIG. 6 illustrates a method 200 for generating electricity and purifying hydrogen. The method includes a step 210 of providing an electrochemical cell having an anode inlet for receiving fuel, an anode outlet for exhausting fuel, a cathode inlet for receiving oxidant, and a cathode outlet for exhausting at least one of oxidant and purified hydrogen, and a step 220 of operating the electrochemical cell to generate electricity and purify hydrogen. For example, operating the electrochemical cell to generate electricity may include applying an electrical load to the electrochemical cell. Operating the electrochemical cell to purify hydrogen may include applying an electrical potential to the electrochemical cell.

From the present description, it will be appreciated that a combination in accordance with the present invention may also be partitioned into more than two portions or include more than two electrochemical cell stacks. In this case, the amount of power generation and hydrogen purification may be variably controlled. In addition, the stacks may be wired such that direct current power generated by one portion of the stack (e.g., operating in a fuel cell mode) may provide the direct current power supply for another part of the stack (e.g., operating in a hydrogen pump mode).

It will also be appreciated that the combinations may be operated in the hydrogen pump mode periodically to remove contaminants from the electrode/catalyst structures of the electrochemical cells to improve long-life performance of the electrochemical cells in the power generation and/or the hydrogen purification modes. The combinations may also be designed with the stacks formed of electrochemical cells that can withstand pressurization of at least the cathode side of the cell so that in the hydrogen pump mode, hydrogen can be compressed as well as purified. The combinations may further be fitted with additional valves and piping such that nitrogen or another inert gas may be used as a purge flow when switching operations of the stack (or portions thereof) between power generation and hydrogen purification modes.

Figure 7:
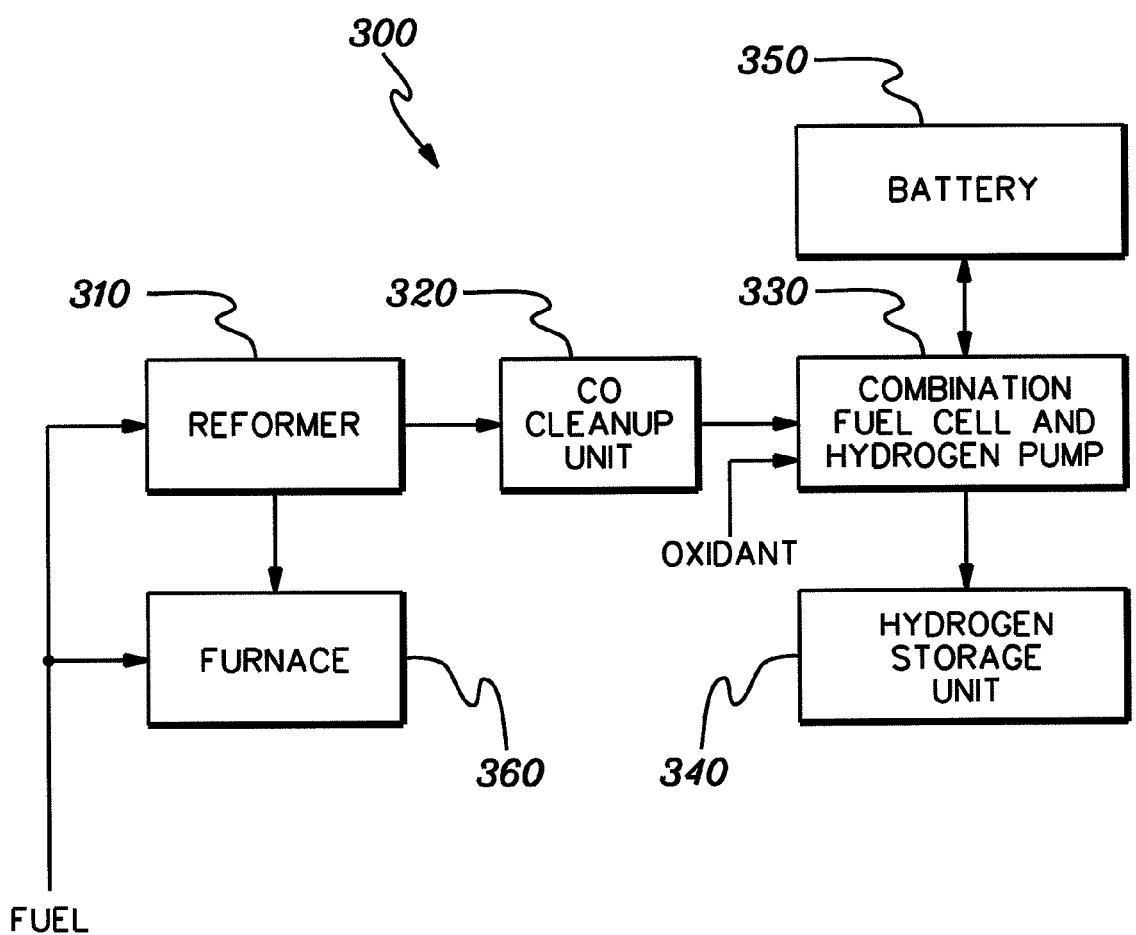
FIG. 7 is a diagrammatic illustration of a hydrogen fuel infrastructure system in accordance with the present invention.

FIG. 7 is an example of one embodiment of a hydrogen fuel infrastructure system 300 in accordance with the present invention which may include a reformer 310 such as a catalytic partial oxidation (CPO) reformer, a steam reformer, or an autothermal reformer for converting a hydrocarbon such as methane or methanol into a hydrogen-rich stream, a carbon monoxide cleanup device 320 for reducing the amount of carbon monoxide in the reformate, a combination fuel cell and hydrogen pump system 330 such as described above for generating electricity and purifying hydrogen, a hydrogen storage unit 340, and an electrical storage unit 350 such as a battery. When heat generation is needed, the system may also include a furnace 360.

The system may be disposed in a service station for providing a supply of hydrogen for use in motor vehicles. It will be appreciated that the system may also be disposed in a building or home for generation of electricity, and purifying hydrogen which may be stored for later use.

Figure 8:
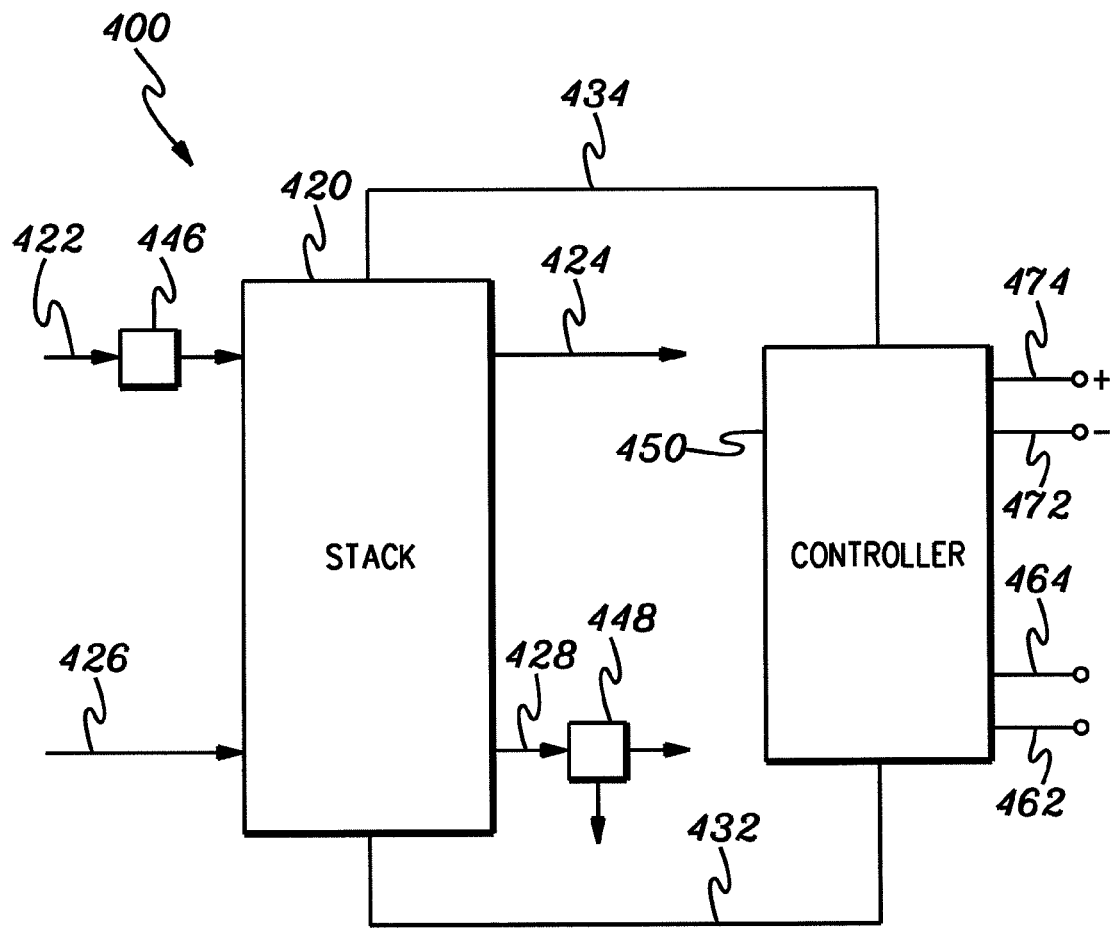
FIG. 8 is a diagrammatic illustration of a combination fuel cell and oxygen pump in accordance with the present invention.

FIG. 8 illustrates a combination fuel cell and oxygen pump 400 which may be configured in a fuel cell mode for generating electricity and in an oxygen pump mode for purifying and/or compressing oxygen, and which may be suitably employed in an oxygen infrastructure system. This type of device may be valuable in the medical field such as in hospitals or on submarines where there exists a need for both electrical generation and pure oxygen generation.

Combination 400 generally includes at least one electrochemical cell, for example which may be a stack 420 of electrochemical cells as illustrated in FIG. 8, having an anode inlet 422 for receiving a fuel such as reformate, an anode outlet 424 for exhausting fuel such as reformate, a cathode inlet 26 for receiving an oxidant such as air, a cathode outlet 428 for exhausting oxidant such as air or purified hydrogen, and a first electrical connector 432 and a second electrical connector 434 for applying an electrical load or an electrical potential to stack 420.

A first valve 446 is attached to anode inlet 422 for controlling fuel to stack 420. A second valve 448, for example a three-way valve, is attached to cathode outlet 428 for either exhausting oxidant from stack 420 in a first direction or exhausting purified oxygen in a second direction different from the first direction.

A controller 450 is attached to first electrical connector 432 and second electrical connector 434 for applying either an electrical load to stack 420 for generating electricity, or an electrical potential to stack 420 for purifying oxygen. Controller 450 may include electrical output terminals 462 and 464 for applying an electrical load to stack 420. For example, a rechargeable battery may be connected to electrical output terminals 462 and 464. Controller 450 may also include electrical input terminals 472 and 474 for applying an electrical potential to stack 420. Controller 450 may include mechanical switch or switches, or may be automated and include a microprocessor or microcontroller.

Combination 400 may include a solid oxide electrochemical cell having a hard ceramic electrolyte which is operated at temperatures up to about 1,000 degrees C. (about 1,800 degrees F.). For example, a mixture of zirconium oxide and calcium oxide may form a crystal lattice, though other oxide combinations may be used as electrolytes. The solid electrolyte may also be coated on both sides with specialized porous electrode materials.

Figure 9:
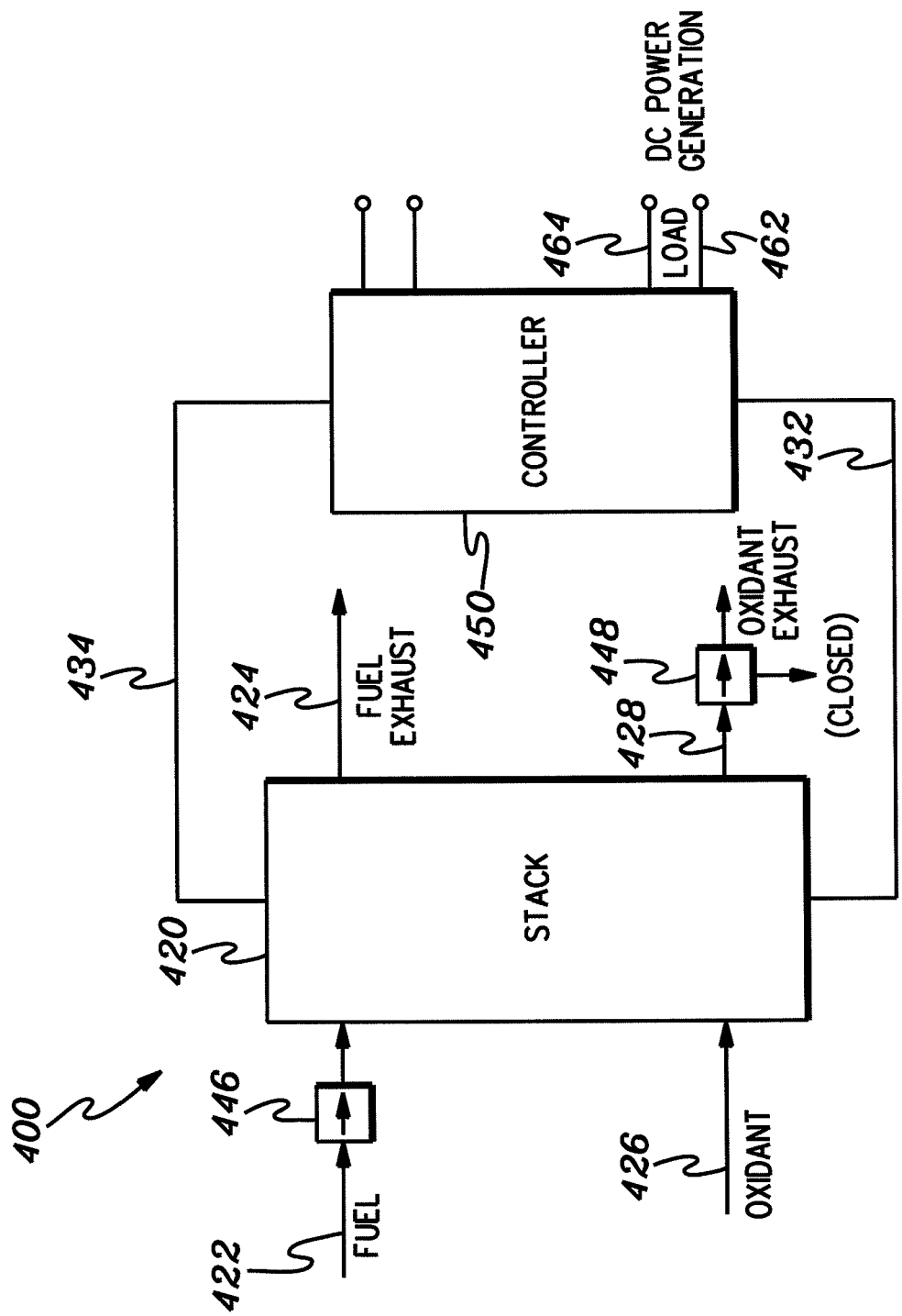
FIG. 9 is a diagrammatic illustration of the combination fuel cell and oxygen pump of FIG. 8 configured as a fuel cell.

FIG. 9 illustrates combination 10 configured in a fuel cell mode for generating electricity. For example, first valve 446 is operated to allow a supply of fuel to anode inlet 422 and exhausted via anode outlet 424, oxidant is supplied to cathode inlet 426, and second valve 448 is operated to exhaust oxidant from cathode outlet 428 in a first direction, e.g., to a vent. Electrical output terminals 462 and 464 of controller 450 are connected to an electrical load which load is applied across stack 420 via electrical connectors 432 and 434.

In the configuration of combination 400 in a fuel cell mode, at these high operating temperature, oxygen ions (with a negative charge) migrate through the crystal lattice. When a fuel containing hydrogen is passed over the anode, a flow of negatively charged oxygen ions moves across the electrolyte to oxidize the fuel. Electrons generated at the anode travel through an external load to the cathode, completing the circuit and supplying electric power.

Figure 10:
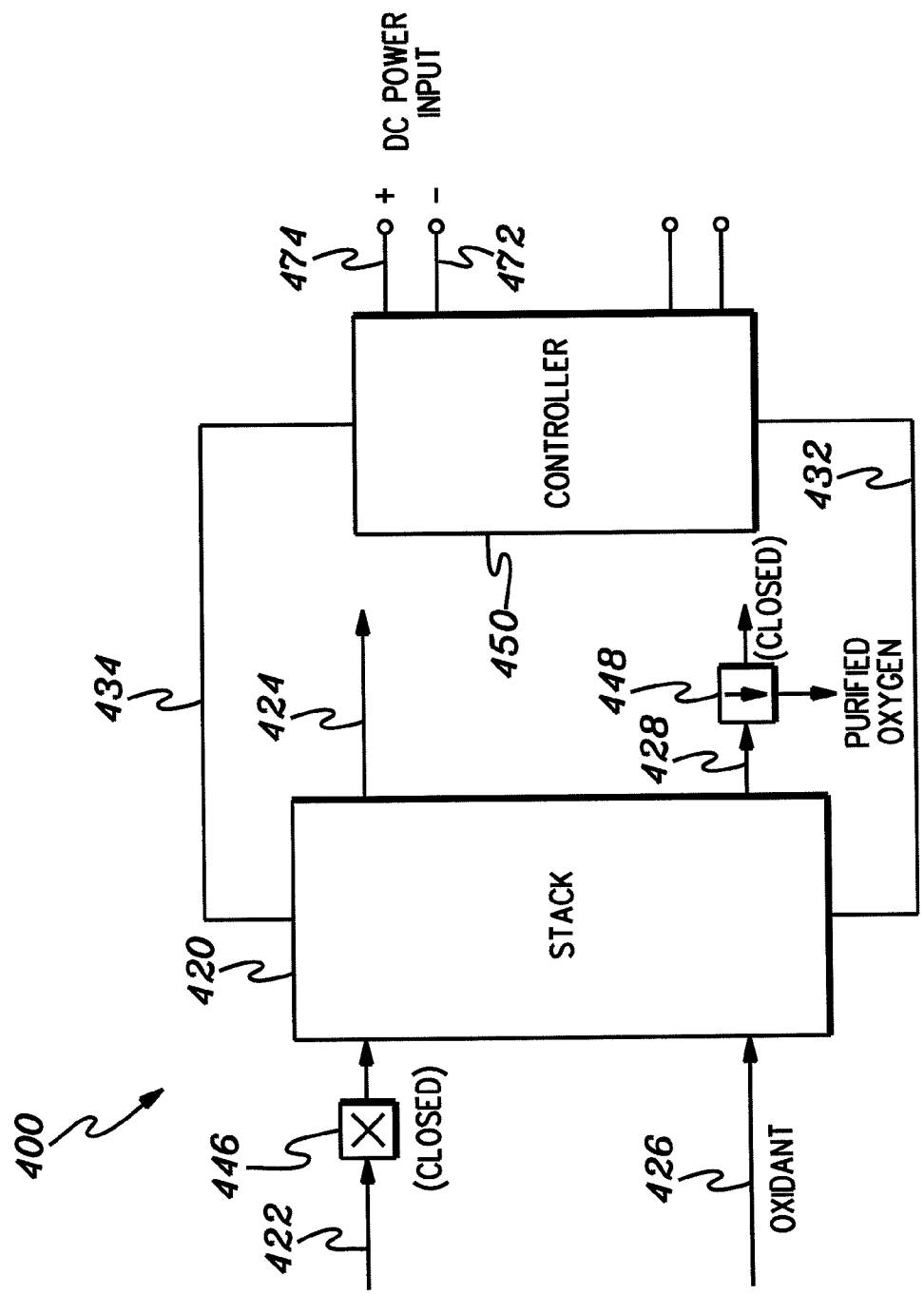
FIG. 10 is a diagrammatic illustration of the combination fuel cell and oxygen pump of FIG. 8 configured as an oxygen pump.

FIG. 10 illustrates combination 400 configured in an oxygen pump mode for purifying and/or compressing oxygen. For example, first valve 446 is operated to close or block the supply of fuel such as reformate to anode inlet 422, a supply of oxidant is provided to cathode inlet 426, and second valve 448 is operated to direct purified oxygen in a second direction (e.g., the first direction for directing exhaust oxidant as shown in FIG. 9 is closed or blocked). Electrical input terminals 472 and 474 of controller 450 may be connected to a power supply for providing an electrical potential across stack 420 via electrical connectors 432 and 434.

In the configuration of combination 400 in an oxygen pump mode, oxidant such as air flows into the electrochemical cell anode, electrical energy is supplied between the electrodes to overcome the internal resistance of the electrochemical cell, dissociate the oxygen in the gas-to-be treated to protons, and drive the protons through the solid oxide to the opposite side for recovery as purified and/or pressurized oxygen at the cathode outlet. The oxygen stream may be stored.

Figure 11:
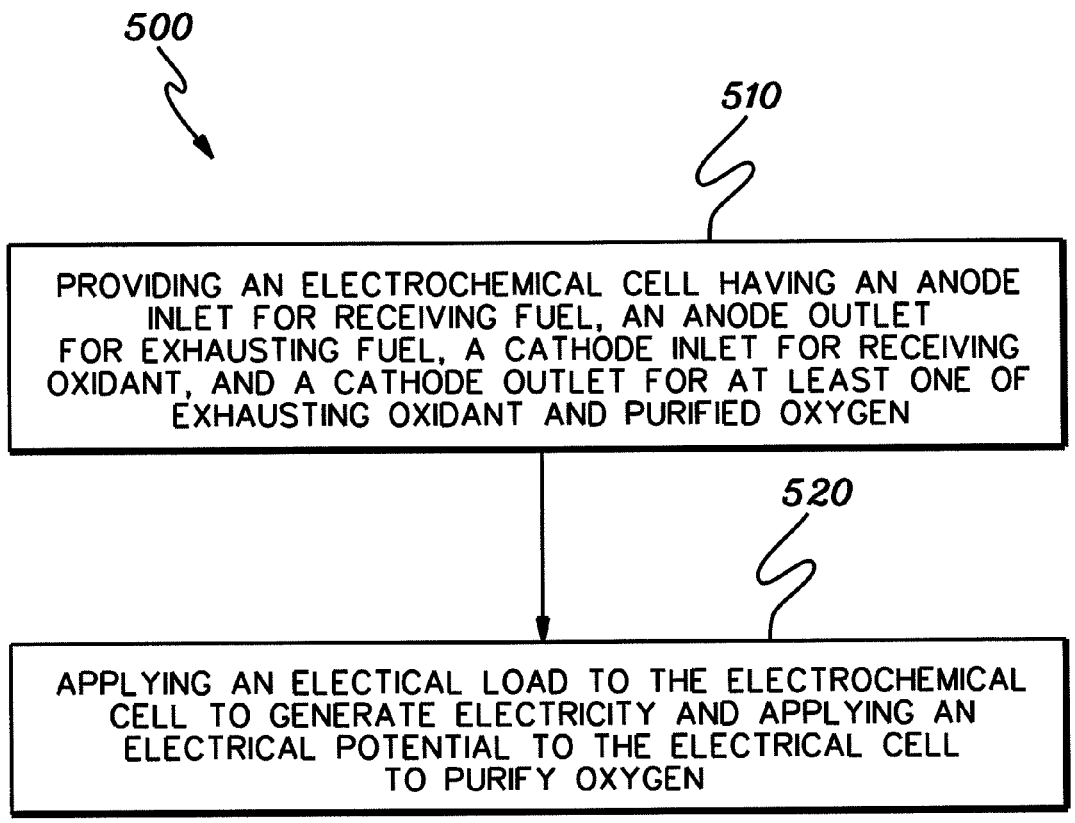
FIG. 11 is a flowchart of a method for generating electricity and purifying oxygen in accordance with the present invention.

FIG. 11 illustrates a method 500 for generating electricity and purifying oxygen. The method includes a step 510 of providing an electrochemical cell having an anode inlet for receiving fuel, an anode outlet for exhausting fuel, a cathode inlet for receiving oxidant such as air, and a cathode outlet for exhausting at least one of oxidant and purified oxygen, and a step 520 of operating the electrochemical cell to generate electricity and purify oxygen. For example, operating the electrochemical cell to generate electricity may include applying an electrical load to the electrochemical cell. Operating the electrochemical cell to purify oxygen may include applying an electrical potential to the electrochemical cell.

Figure 12:
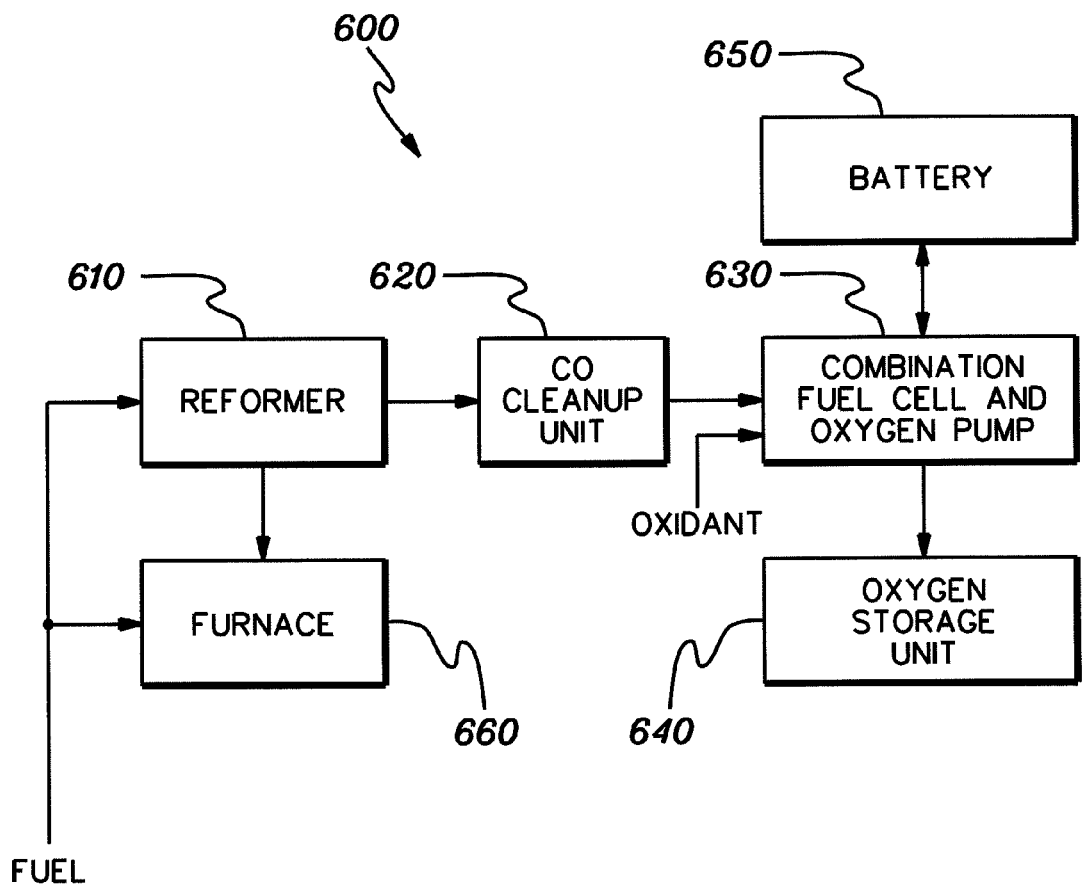
FIG. 12 is a diagrammatic illustration of an oxygen infrastructure system in accordance with the present invention.

FIG. 12 is an example of one embodiment of a oxygen infrastructure system 600 in accordance with the present invention which may include a reformer 610 such as a catalytic partial oxidation (CPO) reformer, a steam reformer, or an autothermal reformer for converting a hydrocarbon such as methane or methanol into a hydrogen-rich stream, a carbon monoxide cleanup device 620 for reducing the amount of carbon monoxide in the reformate, a combination fuel cell and oxygen pump 630 such as described above for generating electricity and purifying oxygen, an oxygen storage unit 640, and an electrical storage unit 650 such as a battery. When heat generation is needed, the system may also include a furnace 660.

While various embodiments of the present invention have been illustrated and described, it will be appreciated by those skilled in the art that many further changes and modifications may be made thereunto without departing from the spirit and scope of the invention.

The invention claimed is:

1. A combination fuel cell and ion pump comprising:

an electrochemical cell comprising an anode inlet means for only receiving fuel, an anode outlet means for only exhausting fuel, a cathode inlet means for only receiving oxidant, a cathode outlet means for only exhausting oxidant and purified hydrogen, and a first electrical connector and a second electrical connector;

a first valve having a first position for allowing only a supply of oxidant to said cathode inlet of said electrochemical cell and a second position for blocking a supply of oxidant to said cathode inlet of said electrochemical cell; and a controller for applying an electrical load to said first and said second electrical connectors when said first valve is in said first position to allow flow of oxidant to said cathode inlet wherein said electrochemical cell acts as a fuel cell to generate electricity, and applying an electrical potential to said first and said second electrical connectors when said first valve is in said second position to block flow of oxidant to said cathode inlet wherein said electrochemical cell acts a hydrogen pump to exhaust purified hydrogen from the cathode outlet.

2. The combination fuel cell and ion pump of claim 1 further comprising a second valve attached to said cathode outlet for exhausting oxidant and purified hydrogen from said electrochemical cell.

3. The combination fuel cell and ion pump of claim 2 wherein said second valve is operable to exhaust oxidant from said electrochemical cell in a first direction and exhaust purified hydrogen from said electrochemical cell in a second direction different from said first direction.

4. The combination fuel cell and ion pump of claim 1 wherein the electrochemical cell comprises a plurality of electrochemical cells.

5. The combination fuel cell and ion pump of claim 1 wherein the electrochemical cell comprises a PEM electrochemical cell.

6. A hydrogen fuel infrastructure system comprising
a combination fuel cell and ion pump of claim 1;
a storage tank for storing purified hydrogen from said combination fuel cell and ion pump; and
a reformer for supplying fuel to said combination fuel cell and ion pump.

7. The hydrogen fuel infrastructure system of claim 6 further comprising a battery for storing electrical energy from said combination fuel cell and ion pump.

8. A method for generating electricity and purifying of hydrogen, the method comprising:
providing an electrochemical cell comprising an anode inlet for receiving fuel, an anode outlet for exhausting fuel, a cathode inlet for receiving oxidant, and a cathode outlet means for only exhausting oxidant and purified hydrogen, and a first valve having a first position for allowing only a supply of oxidant to the cathode inlet of the electrochemical cell and a second position for blocking a supply of oxidant to the cathode inlet of the electrochemical cell;
providing a flow of only fuel to the anode inlet and out the anode outlet;
providing a flow of only oxidant through the first valve in the first position to the cathode inlet and applying an electrical load to the electrochemical cell to operate the electrochemical cell to generate electricity; and
blocking the flow oxidant through the first valve in the second position to the cathode inlet and applying an electrical potential to the electrochemical cell to operate the electrochemical cell to exhaust purified hydrogen from the cathode outlet.

9. The method of claim 8 further comprising humidifying the purified hydrogen.

10. The method of claim 8 wherein the electrochemical cell comprises a plurality of electrochemical cells.

11. The method of claim 8 wherein the electrochemical cell comprises a PEM electrochemical cell.

12. The combination fuel cell and ion pump of claim 1 wherein the anode inlet means is operable for only receiving reformate, and the anode outlet means is operable for only exhausting reformate.

13. The method of claim 8 wherein the fuel comprises reformate.

* * * * *